US005134425A

United States Patent [19]

Yeung

[11] Patent Number: 5,134,425

[45] Date of Patent: Jul. 28, 1992

[54] OHMIC HEATING MATRIX

[75] Inventor: King-Wah W. Yeung, Cupertino, Calif.

[73] Assignee: Hewlett-Packard Company, Palo Alto, Calif.

[21] Appl. No.: 777,480

[22] Filed: Oct. 17, 1991

Related U.S. Application Data

[63] Continuation of Ser. No. 468,493, Jan. 23, 1990, abandoned.

[51] Int. Cl.[5] ..................... G01D 15/00; H04N 1/032; H04N 1/034; B41J 2/35

[52] U.S. Cl. ............................ 346/76 PH; 400/120; 400/121; 400/126; 340/825.52; 340/825.79; 340/825.81; 340/825.82; 346/140 R

[58] Field of Search ................... 346/76 PH, 140 PD; 400/120, 121, 126; 340/825.52, 825.53, 825.79, 825.81, 825.82

[56] References Cited

U.S. PATENT DOCUMENTS

| | | | |
|---|---|---|---|
| 3,938,136 | 2/1976 | Kawakami | 350/333 |
| 4,032,925 | 6/1977 | Kos | 346/76 PH |
| 4,791,440 | 12/1988 | Eldridge et al. | 346/140 PD |

FOREIGN PATENT DOCUMENTS

| | | | |
|---|---|---|---|
| 0186059 | 7/1986 | European Pat. Off. | 346/76 PH |
| 0049967 | 3/1985 | Japan | 346/76 PH |

*Primary Examiner*—Benjamin R. Fuller
*Assistant Examiner*—Huan Tran

[57] ABSTRACT

Several embodiments of an apparatus for directly driving all addressed and unaddressed resistive heating elements in a matrix of heating elements is disclosed. Since the unaddressed heating elements are directly driven, the parasitic voltages that are found across unaddressed heating elements in prior-art arrays are replaced with specified constant voltages. Additionally, the variation in total power dissipation of all the heating elements in the matrix can be reduced. When a matrix of directly driven heating elements is used in a thermal printer or thermal-ink-jet printer several advantages are realized. The directly driven unaddressed heating elements have a specified low voltage across them instead of a parasitic voltage which may have a magnitude large enough to cause the printhead to misfire. Additionally, the reduction in the variation of the total power dissipation reduces the variation in the printhead temperature which reduces the variation in the printed dot size.

2 Claims, 6 Drawing Sheets

OHMIC HEATING MATRIX

CROSS REFERENCE TO RELATED APPLICATION

This application is a continuation of copending application Ser. No. 07/468,493, filed Jan. 23, 1990, now abandoned.

BACKGROUND OF THE INVENTION

This invention relates to systems that address and apply voltages across selected ohmic heating elements in a matrix.

Each heating element in a thermal printhead or a thermal-ink-jet printhead can have interconnect and drive circuitry dedicated exclusively to it. Alternatively, the heating elements can be configured into a matrix in which the heating elements share the interconnect and drive circuitry. FIG. 1 shows an example of such a prior-art matrix (20). The resistors in each row share drive circuitry (26) and the resistors in each column share electrical ground (28). If an individual resistor is "addressed" (i.e., selected), the drive voltage is applied to its row connector (29) and its column connector (30) is grounded, thus creating a voltage drop across it and causing it to dissipate electric power as heat. However, if a row or column does not include an addressed resistor, then the corresponding row connector (29) or column connector (30) is disconnected from drive circuitry (26) or electrical ground (28), respectively, and will assume a voltage imposed by other parts of the circuit.

If an independent voltage source or electrical ground is directly connected via low-resistance conductors to each end of a resistor, thus establishing the voltage across it, then the resistor will be said to be "directly driven". Addressed resistors are directly driven at full power. In the circuit shown in FIG. 1, only addressed resistors (24) are directly driven and "parasitic" voltages appear across unaddressed resistors (22, 23, 25, 27). The parasitic voltages result from current flowing through unaddressed resistors along alternate paths between the drive voltage source and electrical ground (e.g., through the combination of unaddressed resistors (23), (25), and (27)). These currents are referred to as "parasitic currents".

Although power dissipation is desired in the addressed resistors only, the parasitic voltages cause significant power dissipation in the unaddressed resistors. The magnitude of the parasitic voltage across any particular resistor is influenced by the dimensions of the matrix, the number and location of the addressed resistors, and other factors. The total power dissipation of all the resistors in a matrix depends on the number of addressed resistors and the magnitudes of the parasitic voltages across the unaddressed resistors. If, as in standard applications, a resistor matrix energizes arbitrary addressable patterns of resistors, the parasitic voltages may become excessive and the total power dissipation will vary greatly.

Two problems arise when the prior-art resistor matrices are used in thermal printheads or thermal-ink-jet printheads. First, the parasitic voltages across the unaddressed resistors may become large enough to cause the printhead to misfire. For example, in the prior-art matrix (20) shown in FIG. 1, the voltage across some of the unaddressed resistors can reach two-thirds of the drive voltage, resulting in a power dissipation that is 4/9 of the power dissipated by an addressed resistor. This unwanted power dissipation is likely to be of sufficient magnitude to cause the printhead to misfire. Second, the size of the ink droplets ejected by a thermal-ink-jet printhead or the size of the dots printed by a thermal printhead depends on the printhead temperature which generally depends on the total power dissipation of all the heating elements. If the total power dissipation varies appreciably during operation, the resulting printhead temperature variations can cause non-uniformity in the size of the printed dots and degrade the print quality.

U.S. Pat. No. 4,791,440, by Eldridge et al. entitled *Thermal Drop-On-Demand Ink Jet Print Head,* discloses a resistor matrix that solves some of the problems of prior-art matrices by directly driving some, but not all, of the unaddressed resistors. The remaining unaddressed resistors are not directly driven and parasitic voltages appear across them. As described above, the magnitudes of the parasitic voltages are determined by operating conditions and various parameters of the matrix, rather than being set by the drive circuitry. The maximum ratio of the power dissipated by an unaddressed resistor to the power dissipated by an addressed resistor is 4/9, 9/16, or 16/25 for Eldridge matrices having 3, 4, or 5 rows respectively. The power dissipated by individual unaddressed resistors and the variations in the total power dissipation can become excessive and cause the problems described above.

SUMMARY OF THE INVENTION

The object of the invention is to directly drive each addressed and unaddressed heating element (i.e., resistor) in a matrix with a specified voltage and to minimize variations in the total power dissipation of all the heating elements.

A generalized schematic of the present invention is shown in FIG. 2. Briefly, the invention has a matrix and various drivers for applying voltages across all the addressed and unaddressed heating elements. Moreover, the present invention is an apparatus with a matrix that has two or more row connectors, each connecting a row of heating elements together by connecting to the first end of each heating element in that row. The matrix has two or more column connectors, each connecting to the second end of one heating element in each row so that each heating element is connected between a row connector and a column connector. The apparatus has row drivers, each of which drives a row of heating elements through a row connector. The apparatus has column drivers which drive those columns of heating elements containing an addressed heating element, so that the voltage across an addressed heating element is the difference between the row and column drive voltages. Also, the apparatus has auxiliary row and auxiliary column drivers which directly drive each unaddressed heating element with a specific voltage.

By directly driving each heating element in the matrix with a specified voltage, the present invention offers the advantages of replacing the parasitic voltages across the unaddressed heating elements with specified constant voltages and limiting the variations in the total power dissipation of all the heating elements. When used in a thermal-ink-jet printhead or a thermal printhead, the present invention provides significant benefits. In the embodiments of the invention disclosed herein, the power dissipated by each unaddressed heating element is less than or equal to one-fourth of the power that is dissipated by an addressed heating element, thus greatly reducing the danger of misfiring in any particular printhead design. An additional advantage of the present invention is that greater uniformity in the size of the drops ejected by a thermal-ink-jet printhead or dots printed by a thermal printhead is achieved by limiting variations in the total power dissipation of the printhead and thus limiting variations in the printhead temperature.

Although it is possible to simultaneously address heating elements located in different rows, heating elements are addressed in a single row at a time in most applications. The row-by-row mode of operation is assumed throughout the following description, but the scope of the invention is not limited in this way.

FIG. 3 shows the preferred embodiment of the invention. The preferred embodiment has, in addition to the advantages discussed above, the advantage that the total power dissipation of all the heating elements is constant regardless of the number that are addressed. The constant total power dissipation results in a nearly constant printhead temperature which helps to maintain uniformity in the printed dot size. The preferred embodiment offers the additional advantage of directly driving the unaddressed heating elements with a voltage equal to zero or to one-half the voltage used to drive the addressed heating elements. Hence, the power dissipated by each unaddressed heating element is limited to one-fourth of the power dissipated by an addressed heating element. This ratio is small enough to prevent misfiring in most thermal and thermal-ink-jet printhead designs.

The preferred embodiment offers the additional advantage that, regardless of the number and location of addressed heating elements, the current flowing through either the column driver (74) or auxiliary column driver (78) is equal to the current that would flow through a single addressed heating element. In prior-art matrices, because of the presence of parasitic currents, the column driver currents vary widely and reach significantly larger values. In this embodiment, the reduced column driver and auxiliary column driver current magnitudes permit the use of smaller and less expensive column switching transistors (shown in FIG. 3 as simple switches located between the drivers and each column connector). The constant current flowing through either the column driver or the auxiliary column driver results in a constant voltage drop across the driver output resistance and the series resistance (switching transistors, cables, connectors, etc.) between the driver and the matrix. Since this voltage drop is constant, it can be compensated for by slight adjustment of the driver source voltages.

Another advantage of the preferred embodiment is that the magnitude of the current drawn from the row driver varies only by a factor of two. This limited range reduces the variation of the voltage drop across the row driver output resistance and the series resistance (switching transistors, cables, connectors, etc.) between the matrix and the row driver.

The alternate embodiment of the invention shown in FIG. 4 has all the advantages of the generalized embodiment, shown in FIG. 2, plus the additional advantage that the total power dissipation of the unaddressed heating elements is constant regardless of the number of addressed heating elements. If the printhead efficiency is exceptionally high (i.e., most of the heat generated by the addressed heating elements is transferred to the ink droplets in the case of a thermal-ink-jet printer or to the thermal paper in the case of a thermal printer), the heat transferred to the printhead will consist of primarily the power dissipated by the unaddressed heating elements. In this case, this alternate embodiment will minimize printhead temperature fluctuations and help to maintain a uniform printed dot size. An additional advantage of this alternate embodiment is that the power dissipation in each unaddressed heating element is limited to one-fourth of that in each addressed heating element, thereby reducing the chances that the printhead will misfire as explained above.

The alternate embodiment shown in FIG. 5 has all the advantages of the generalized embodiment, shown in FIG. 2, plus the additional advantage of directly driving each unaddressed heating element with one-third the drive voltage so that the power dissipated by each unaddressed heating element is only one-ninth the power dissipated by each addressed heating element, thereby greatly reducing the chance that a printhead will misfire. Also, this embodiment has the advantage that all the unaddressed heating elements have the same power dissipation and obtain approximately the same temperature so that when the heating elements are addressed they produce dots having approximately the same size.

The circuit shown in FIG. 6 limits the power dissipation in the unaddressed heating elements to one-fourth of that in the addressed heating elements and requires only a single voltage supply.

DETAILED DESCRIPTION OF THE PREFERRED EMBODIMENT OF THE INVENTION

Figure 2:
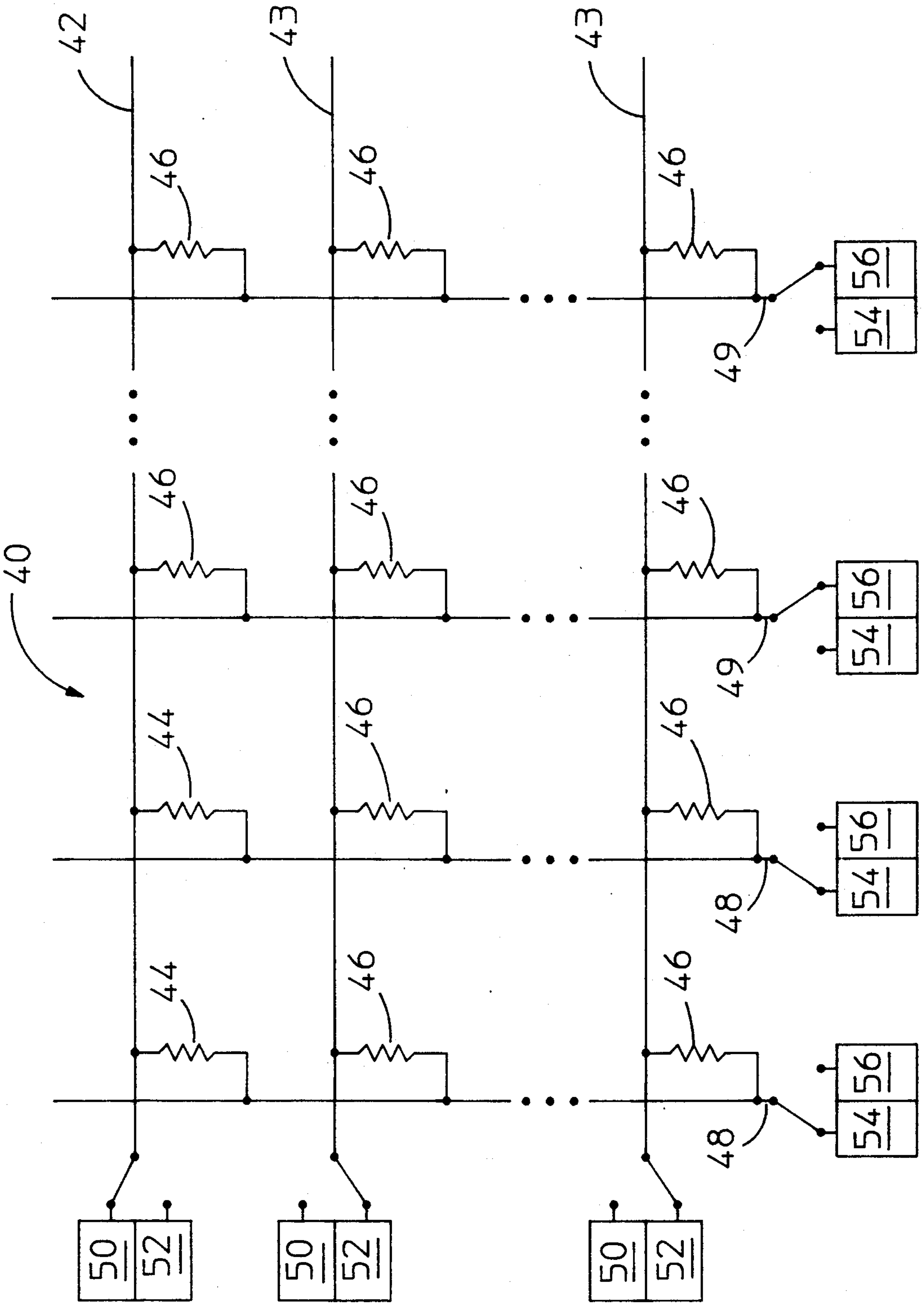
FIG. 2 shows a generalized schematic that illustrates preferred embodiment of the invention as well as the alternate embodiments of the invention.

FIG. 2 shows a generalized schematic of the present invention that illustrates the preferred embodiment of the invention as well as alternate embodiments of the invention. All of these embodiments have the advantages of directly driving all of the unaddressed heating elements so that specified constant voltages replace the parasitic voltages and of limiting the variations in the total power dissipation of all the heating elements.

The apparatus embodying the invention has a matrix (40) having two or more row connectors (42, 43) that form rows of heating elements. A "row" of heating elements is a group of heating elements that can have any physical layout (e.g., a vertical line, a curve, a closed loop, or a random pattern) as long as the first end of each heating element in the group connects to a row connector (42, 43). Likewise, the row connector, also known as the "row means" in the claims, can have any physical layout.

Also, the matrix (40) has two or more column connectors (48, 49) that form columns of heating elements by connecting to the second end of one heating element (44, 46) in each row so that each heating element is connected between a row connector (42, 43) and a column connector. The column connector (48, 49), also known as the "column means" in the claims, can have any physical layout as long as it connects to the second end of one heating element in each row unless that row does not have a heating element available for the column connector (e.g., if all the rows have five heating elements except for one row that has only four heating elements, then one of the column connectors will not connect to a heating element in that row). A "column" of heating elements, like a row of heating elements, can have any physical layout as long as it contains no more than one heating element from each row.

The rows and columns of matrix (40) are driven by four types of drivers (50, 52, 54, 56). A row or column of heating elements is "enabled" when connected to row driver (50) or to column driver (54) respectively. A row or column of heating elements is "disabled" when connected to auxiliary row driver (52) or to auxiliary column driver (56), respectively. A heating element is addressed if both its row and column are enabled, otherwise it is unaddressed. In the situations shown in FIGS. 2-6 only the first row and the first two columns are enabled. Other rows and columns could be enabled by changing switch positions.

Although it is possible to enable several rows simultaneously, in most applications, only a single row is enabled at a time. The row-by-row mode of operation is assumed throughout the following description, but the scope of the invention is not limited in this way. In some applications each row of the matrix will be enabled sequentially whether or not that row includes an addressed heating element. In other applications, only those rows that include an addressed heating element will be enabled. Although it is possible to enable columns that do not contain an addressed resistor, throughout this description it is assumed that such columns are disabled, but the scope of the invention is not limited in this way.

Row driver (50) and column drivers (54) directly drive addressed heating elements (44) at full power. Row driver (50) and auxiliary column drivers (56) directly drive each unaddressed heating element (46) in the enabled row of heating elements. Auxiliary row drivers (52) and column drivers (54) directly drive unaddressed heating elements (46) in enabled columns of heating elements. Auxiliary row drivers (52) and auxiliary column drivers (56) directly drive the remaining unaddressed heating elements. All unaddressed heating elements (46) are driven so that all parasitic voltages are replaced with specified constant voltages. If matrix (40) is used in a thermal-ink-jet printhead or a thermal printhead, the voltages applied across unaddressed heating elements (46) can be made low enough to prevent the printhead from misfiring. Additionally, the variations in the total power dissipation of the printhead will be limited so that variations in the printed dot size will also be limited.

Figure 3:
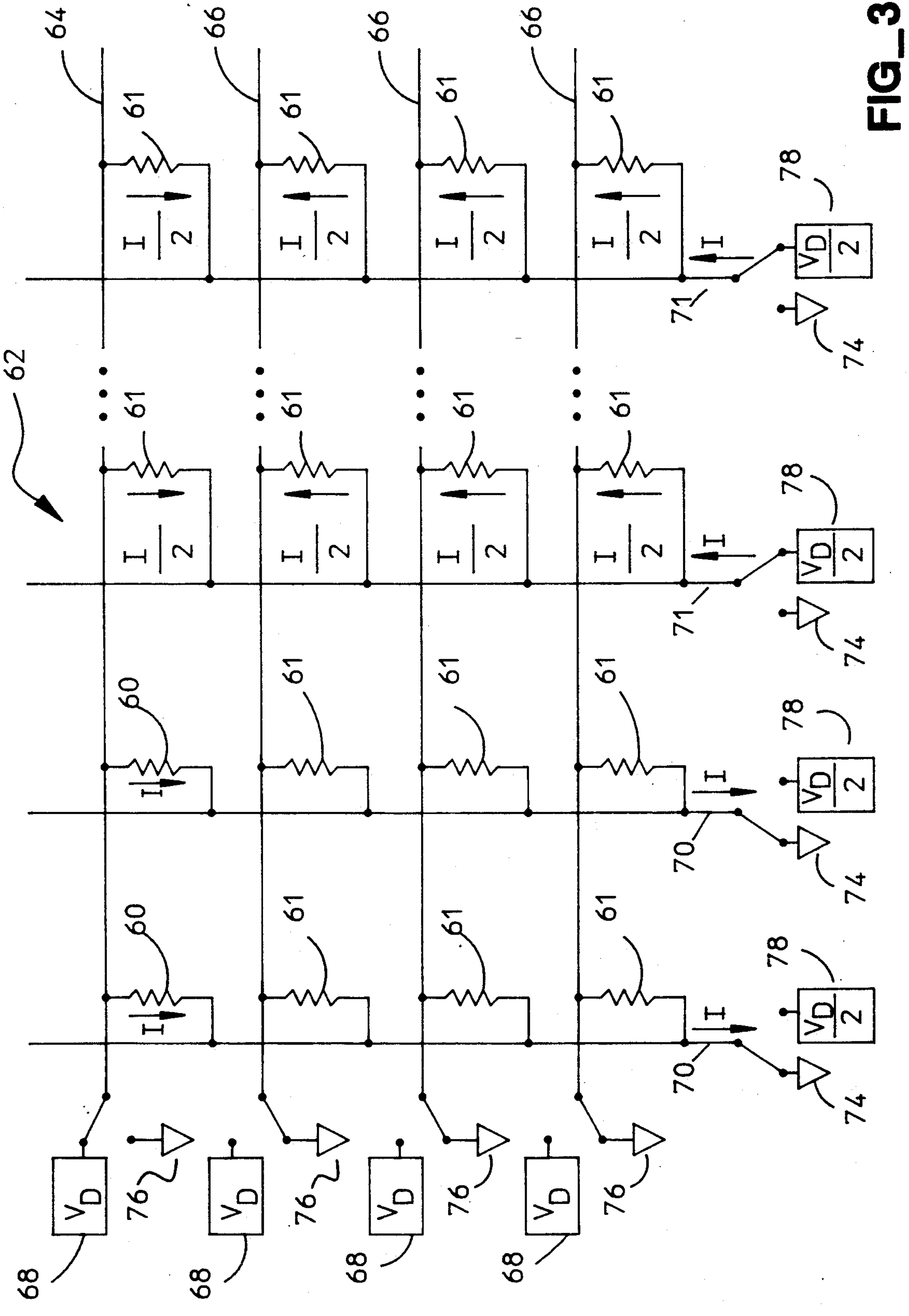
FIG. 3 shows the preferred embodiment of the invention which dissipates the same amount of power regardless of the number of addressed heating elements.

FIG. 3 shows the preferred embodiment of the invention which has the features and the advantages of the generalized embodiment shown in FIG. 2, plus the additional features and advantages described below. Row driver (68), through row connector (64), drives the enabled row of heating elements. Column drivers (74), through column connectors (70), drive the enabled columns of heating elements. Hence the addressed heating elements (60) are connected between row driver (68) and column drivers (74) and have a voltage across them equal to the difference between the row drive voltage and the column drive voltage. In the preferred embodiment of the invention shown in FIG. 3, column drivers (74) are electrical ground. Consequently, the voltage across addressed heating elements (60) equals the row drive voltage, $V_D$.

Auxiliary column drivers (78), through column connectors (71), drive the disabled columns of heating elements so that unaddressed heating elements (61) in the enabled row of heating elements are connected between row driver (68) and auxiliary column drivers (78) and these unaddressed heating elements have a voltage across them equal to the difference between the row drive voltage and the auxiliary column drive voltage. In the preferred embodiment of the invention shown in FIG. 3, the auxiliary column drive voltage equals one-half the row drive voltage so that the voltage across the unaddressed heating elements in the enabled row equals one-half the row drive voltage, $V_D/2$.

Auxiliary row driver (76) drives the disabled rows of heating elements. Each unaddressed heating element that is located in an enabled column is connected between an auxiliary row driver (76) and a column driver (74) and has a voltage across it equal to the difference between the auxiliary row drive voltage and the column drive voltage. In the preferred embodiment of the invention shown in FIG. 3, the auxiliary row drive voltage equals the column drive voltage (both voltages are zero) so that these unaddressed heating elements have zero voltage across them.

The remaining unaddressed heating elements are located between auxiliary row drivers (76) and auxiliary column drivers (78) and have a voltage across them equal to the difference between the auxiliary row drive voltage and the auxiliary column drive voltage. In the preferred embodiment shown in FIG. 3, the auxiliary row driver is electrical ground and auxiliary column drive voltage is one-half the row drive voltage so that the voltage across these unaddressed heating elements equals one-half the row drive voltage, $V_D/2$.

The total power dissipation of the preferred embodiment shown in FIG. 3 is constant regardless of the number of addressed heating elements (60) because each column dissipates power equal to $I^2R$ ($I=V_D/R$ is the current flowing through each addressed heating element (60) and R is the resistance of the heating elements). If a column includes an addressed heating element (60) (which dissipates power equal to $I^2R$), then the other heating elements in that column, which are unaddressed, have zero voltage across them and do not dissipate any power. If a column does not include any addressed heating elements, then each of the four unaddressed heating elements (61) in that column carries a current equal to I/2 so that the power dissipation of each unaddressed heating element equals $I^2R/4$. Therefore, the power dissipation of each column is $I^2R$ independently of whether the column includes an addressed heating element (60) or not.

If the preferred embodiment shown in FIG. 3 is modified so that it has three rows or five rows, then the matrix will no longer have constant power dissipation. Instead, the power dissipation of a five-row matrix will decrease linearly as the percentage of addressed heating elements increases. If the matrix has three rows, the power dissipation will increase linearly with an increasing percentage of addressed heating elements (60). These alternative power dissipation characteristics may be desirable in certain applications such as driving the matrix of heating elements in a thermal ink jet printer having a certain efficiency in transferring energy to the droplet.

Figure 1:
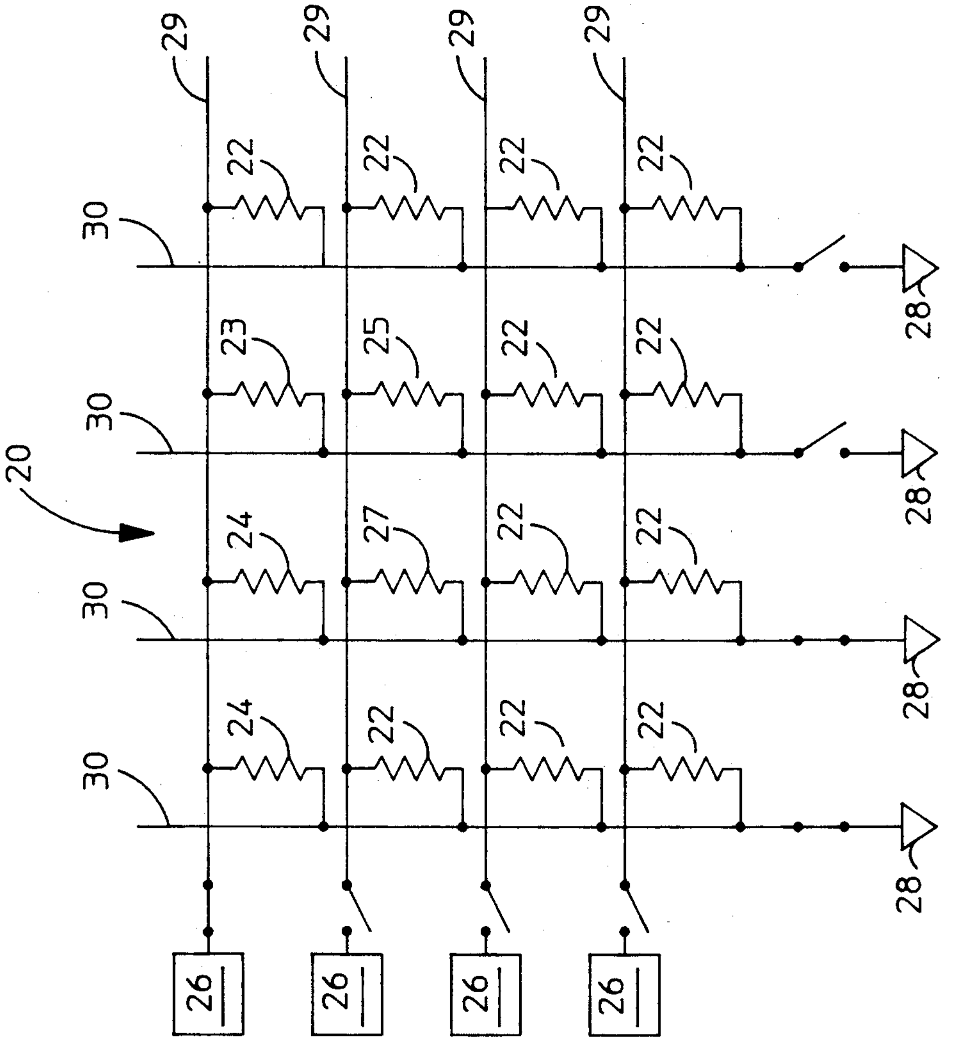
FIG 1 (PRIOR ART)
FIG. 1 shows a prior-art resistor matrix.

The preferred embodiment has the additional advantage that the current drawn from each column driver (74) or each auxiliary column driver (78) is always constant, regardless of the number or location of the addressed heating elements, and is always equal to I, the amount of current needed to drive a single addressed heating element. If a heating element in a column is addressed, then the current drawn from column driver (74) equals I. If all the heating elements in a column are unaddressed, then the magnitude of the current drawn from auxiliary column driver (78) will also equal I, as shown in FIG. 3 for column connectors (71). In the prior-art matrix shown in FIG. 1, the currents flowing into the column drivers fluctuate widely because the parasitic currents flow to the column drivers that are electrically grounded. As a result, the column driver switching transistors are required to carry currents substantially larger than I. Therefore, the preferred embodiment of the invention permits use of switching transistors that are smaller and less expensive than those required by prior-art matrices.

The constant column driver current results in a constant voltage drop across the column driver output resistance and the series resistance (switching transistors, cables, connectors, etc.) between the column driver and the matrix. Since this voltage drop is constant, it can be compensated for by slight adjustment of the column driver source voltage. This applies to the auxiliary column driver also.

Another advantage of the invention is that the drive current drawn from the row drivers varies by a factor of only two. This limits the variation in the voltage drop across the row driver output resistance and the series resistance (switching transistors, cables, connectors, etc.) between the row driver and the matrix to a factor of two. The maximum current occurs when all the heating elements in an enabled row are addressed, each column drawing a current of I from the row driver. The minimum current occurs when all of the heating elements in an enabled row are unaddressed, each column drawing a current of I/2 from the row driver. Therefore, the maximum drive current drawn from the row driver equals the number of columns multiplied by I and the minimum drive current drawn from the row driver equals the number of columns multiplied by I/2.

Figure 4:
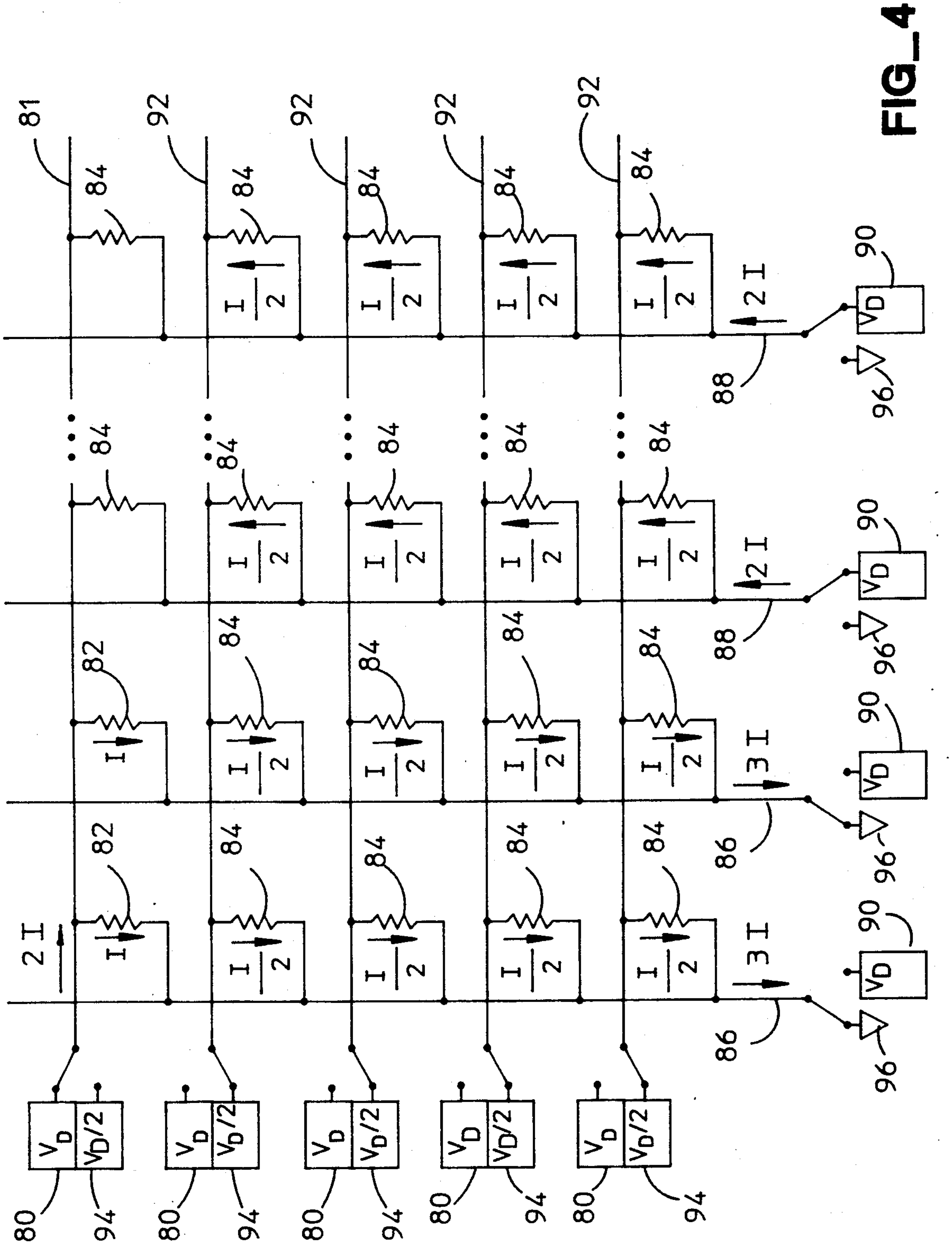
FIG. 4 shows an alternate embodiment of the invention in which the total power dissipation of all of the unaddressed heating elements is constant.

FIG. 4 shows an alternate embodiment of the invention, which has the features and the advantages of the generalized embodiment shown in FIG. 2, plus the additional features and advantages described below. Although FIG. 4 shows this embodiment as having 4 rows of heating elements, it can have more or fewer rows. Row driver (80), through row connector (81), drives an enabled row of heating elements. Column drivers (96), through column connectors (86), drive enabled columns of heating elements. Therefore, addressed heating elements (82) are connected between row driver (80) and column driver (96) and have a voltage across them equal to the difference between the row drive voltage and the column drive voltage. In FIG. 4, column driver (96) is electrical ground so that the row drive voltage, $V_D$, is applied across addressed heating elements (82).

Auxiliary column drivers (90) drive the columns of heating elements that contain only unaddressed heating elements (84). Unaddressed heating elements in an enabled row of heating elements are connected between row driver (80) and auxiliary column drivers (90). In FIG. 4, auxiliary column drivers (90) produce the row drive voltage, $V_D$, so that the voltage across these unaddressed heating elements (84) equals zero.

The remaining rows of heating elements are disabled and auxiliary row drivers (94), through row connectors (92), drive these rows. Unaddressed heating elements (84) that are located in the enabled columns of heating elements are connected between auxiliary row driver (94) and column driver (96) and have a voltage across them equal to the difference between the auxiliary row drive voltage and the column drive voltage. In FIG. 4, the auxiliary row drive voltage equals one-half the row drive voltage, $V_D/2$, so the voltage across these unaddressed heating elements is $V_D/2$. The voltage across unaddressed heating elements located in disabled rows and disabled columns is the difference between the auxiliary row drive voltage, $V_D/2$, and the auxiliary column drive voltage, $V_D$, and hence is equal to $V_D/2$.

The sum total of the power dissipated by the unaddressed heating elements is constant regardless of the number of addressed heating elements. The unaddressed heating elements in an enabled row of heating elements have zero voltage across them and do not dissipate any power. The number of unaddressed heating elements in the other rows is always constant and the voltage across them is always $V_D/2$. Therefore, the unaddressed heating elements always dissipate the same total amount of power.

If the printhead efficiency is exceptionally high, most of the heat generated by the addressed heating elements is transferred to the ink droplets in the case of a thermal-ink-jet printer or to the thermal paper in the case of a thermal printer. The remaining heat generated by the heating elements comes primarily from the unaddressed heating elements and is nearly constant. Since the heat transferred from the heating elements to the printhead is nearly constant, the temperature of the printhead is nearly constant and uniformity of the printed dot size is achieved.

Figure 5:
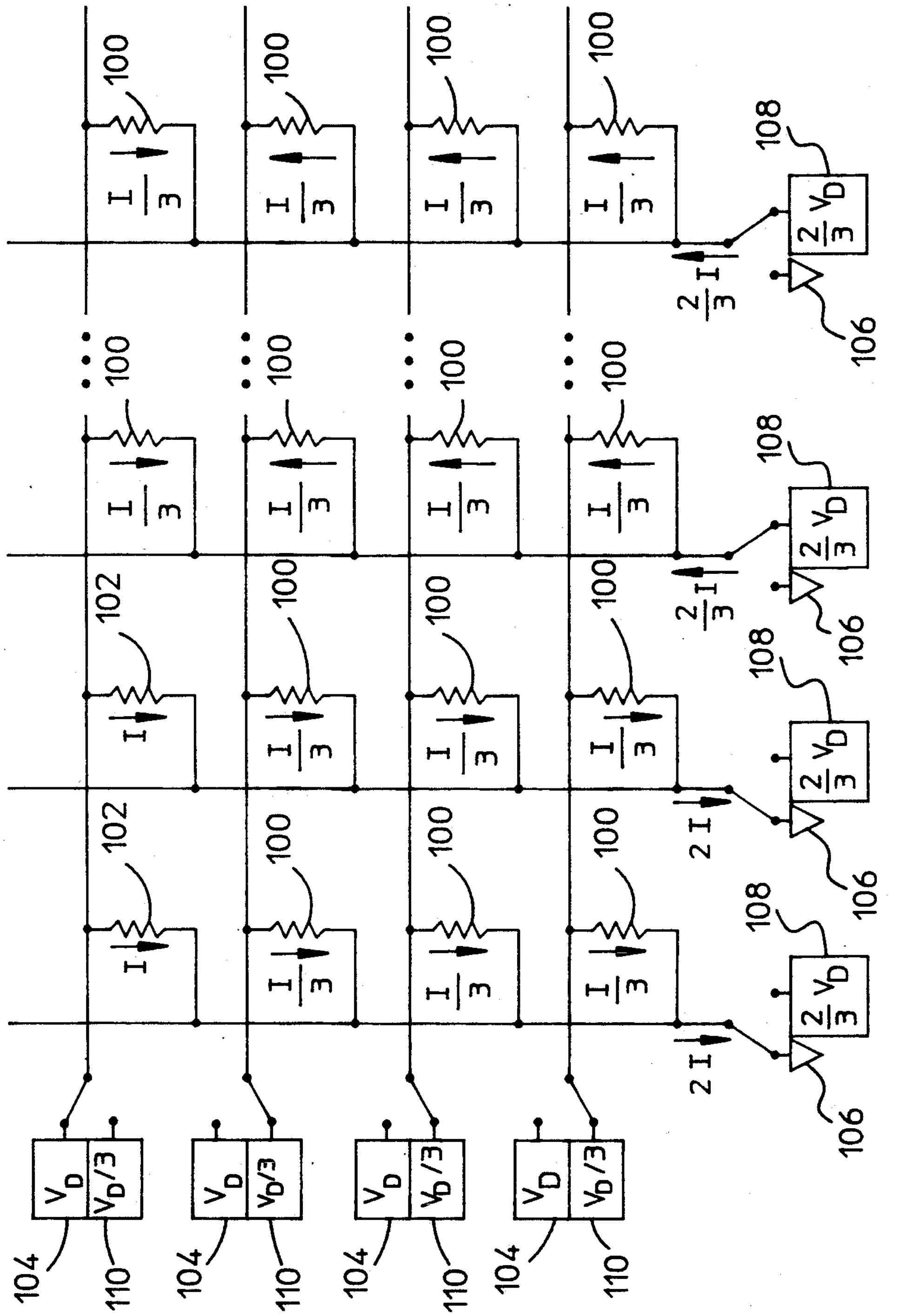
FIG. 5 shows another alternate embodiment of the invention that directly drives each unaddressed heating element with one-third the drive voltage.

FIG. 5 shows an alternate embodiment of the invention, which has the features and advantages of the generalized embodiment, shown in FIG. 2, plus the additional features and advantages described below. Although FIG. 5 shows this embodiment as having 4 rows of heating elements, it can have more or fewer rows. In FIG. 5, the voltage across all unaddressed heating elements (100) is one-third the row drive voltage, $V_D/3$, and the voltage across addressed heating elements is the row drive voltage, $V_D$. Row driver (104) produces the row drive voltage and column driver (106) is electrical ground so that the voltage across addressed heating elements (102) equals the row drive voltage, $V_D$. Each unaddressed heating element (100) is connected between either row driver (104) and auxiliary column driver (108), or auxiliary row driver (110) and column driver (106), or auxiliary row driver (110) and auxiliary column driver (108). In all cases, the voltage across unaddressed heating elements (100) equals one-third the row drive voltage. This lower voltage across the unaddressed heating elements has the advantage of reducing the chances that the printhead will misfire. Also, this embodiment has the advantage that all the unaddressed heating elements have the same power dissipation and attain approximately the same temperature so that when the heating elements are addressed they produce dots having approximately the same size.

Figure 6:
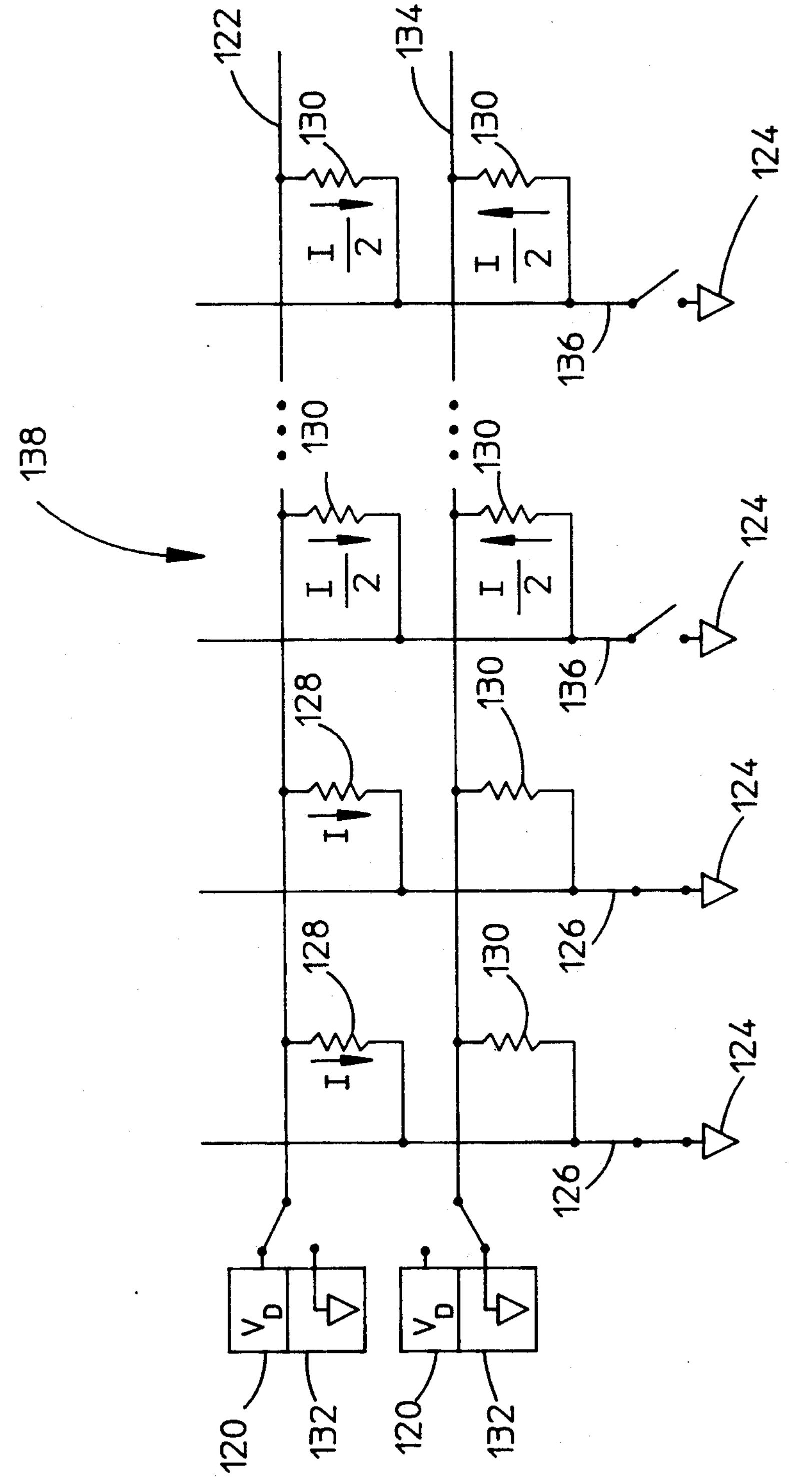
FIG. 6 shows a circuit that requires only a single power supply.

The circuit shown in FIG. 6 has two rows of heating elements and the advantage of requiring only one power supply. Row driver (120), the sole power supply, drives the enabled row of heating elements through row connector (122). Column drivers (124) drive the enabled columns of heating elements which contain addressed heating elements (128). In the circuit shown in FIG. 6, column drivers (124) are electrical ground so that the voltage across addressed heating elements (128) equals the row drive voltage.

Auxiliary row driver (132), which is electrical ground, connects to row connector (134). Unaddressed heating elements (130) connected between auxiliary row driver (132) and column driver (124) have zero voltage across them. The remaining column connectors (136) are not directly driven and each column connector (136) merely connects together in series the two unaddressed heating elements in that column. These pairs of unaddressed heating elements are connected between the row driver and the auxiliary row driver (which is electrical ground) so that each heating element has one-half the row drive voltage, $V_D/2$, across it.

Changes and modifications in the described embodiments can be carried out without departing from the scope of the invention which is intended to be limited only by the scope of the appended claims. The magnitudes of the voltages, the relative magnitudes of the voltages, the polarity of the voltages, and the number of rows and columns can be altered without departing from the scope of the invention. Additionally, the physical layout of all embodiments and the components of all embodiments may be altered without departing from the scope of the invention. A row of heating elements, a row means, a column of heating elements, and a column means can all have any physical layout (e.g., a horizontal line, a vertical line, a curve, a closed loop, a random pattern, etc.). For example, FIG. 2 shows that a row of heating elements is a straight horizontal line of four heating elements (44, 46), that row connector (42, 43) is a straight horizontal wire, that column connector (48, 49) is a straight vertical wire, and that the column of heating elements is a straight vertical line of heating elements. The row of heating elements can contain any number of heating elements equal to or greater than two. The rows of heating elements, row connectors (42, 43), columns of heating elements and column connectors (48, 49) can have any kind of physical layout without the resulting apparatus departing from the scope of the invention.

Likewise, the row drivers, the auxiliary row drivers, the column drivers, and the auxiliary column drivers can drive a group of heating elements having any physical layout as long as the group meets the requirements in the definition stated earlier (i.e., the row drivers and auxiliary row drivers must drive each heating element in its group of heating elements, and the column drivers and auxiliary column drivers must drive not more than one heating element in each row). Additionally, the various drivers can produce relative voltages different from those in the preferred and alternate embodiments.

I claim:

1. An apparatus that has a multiplicity of heating elements that a controller designates as either an addressed heating element or an unaddressed heating element, further comprising:

a. four rows, each attached to a first end of a plurality of heating elements;

b. a plurality of columns, each attached to a second end of four heating elements so that each heating element is attached between one row and one column;

c. a means for driving one addressed heating element in a column with a full power;

d. a means for driving three unaddressed heating elements located in the column that has the addressed heating element with zero power so that the column that has the addressed heating element has a total power dissipation equal to the full power;

e. a means for driving four unaddressed heating elements location in a column that does not have the addressed heating element with one-fourth of the full power so that the column that does not have the addressed heating element has a total power dissipation equal to the full power; and f. so that each column has the total power dissipation equal to the full power and the multiplicity of heating elements has a constant total power dissipation.

2. An apparatus that has a multiplicity of heating elements that a controller designates as either an addressed heating element or an unaddressed heating element, further comprising:

a. one or more rows, each attached to a first end of a plurality of heating elements;

b. a plurality of columns, each attached to a second end of one or more heating elements so that each heating element is attached between one row and one column;

c. one row that has a number of addressed heating elements;

d. a means for driving zero or more unaddressed heating elements located in the row that has the number of addressed heating elements with zero power so that the zero or more unaddressed heating elements have a total power dissipation of zero; and e. a means for driving a group of unaddressed heating elements that are located in a row that does not have the number of addressed heating elements with a constant power so that the zero or more unaddressed heating elements and the group of unaddressed heating elements have a constant total power dissipation regardless of the number of addressed heating elements.

* * * * *